(12) United States Patent
Akatsuka et al.

(10) Patent No.: US 10,380,463 B2
(45) Date of Patent: Aug. 13, 2019

(54) IMAGE PROCESSING DEVICE, SETTING SUPPORT METHOD, AND NON-TRANSITORY COMPUTER-READABLE MEDIA

(71) Applicant: OMRON Corporation, Kyoto (JP)

(72) Inventors: Yuki Akatsuka, Kyoto (JP); Yutaka Kiuchi, Kusatsu (JP); Reiji Takahashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 43 days.

(21) Appl. No.: 15/891,377

(22) Filed: Feb. 8, 2018

(65) Prior Publication Data

US 2019/0065914 A1 Feb. 28, 2019

(30) Foreign Application Priority Data

Aug. 30, 2017 (JP) .................... 2017-165230

(51) Int. Cl.
*G06K 9/68* (2006.01)
*G06K 9/62* (2006.01)
*G06T 3/40* (2006.01)

(52) U.S. Cl.
CPC ......... *G06K 9/6857* (2013.01); *G06K 9/6232* (2013.01); *G06T 3/40* (2013.01); *G06T 3/4076* (2013.01)

(58) Field of Classification Search
CPC .................. G06T 7/001; G06T 3/4053; G06T 2207/20021; G06T 2207/20081
USPC ............... 382/103, 170, 171, 209, 278, 299; 358/1.2, 537, 538, 540
See application file for complete search history.

(56) References Cited

U.S. PATENT DOCUMENTS

| | | | | |
|---|---|---|---|---|
| 7,483,890 B2* | 1/2009 | Zhou | ...................... | G06F 16/284 |
| 7,715,658 B2* | 5/2010 | Cho | ....................... | G06T 3/4084 |
| | | | | 382/226 |
| 7,860,302 B2* | 12/2010 | Sato | ......................... | G06T 7/74 |
| | | | | 382/154 |
| 8,401,333 B2* | 3/2013 | Miyakawa | ................ | G06T 5/50 |
| | | | | 382/284 |
| 8,711,248 B2* | 4/2014 | Jandhyala | .................. | G06T 7/20 |
| | | | | 348/208.1 |

(Continued)

FOREIGN PATENT DOCUMENTS

JP 2017041190 2/2017

*Primary Examiner* — Yosef Kassa
(74) *Attorney, Agent, or Firm* — JCIPRNET

(57) ABSTRACT

An image processing device is provided. An image processing device includes: a program executing part that applies parameter groups to an image processing program which searches a search object using an image group with different resolutions created from an input image, acquires a search result for each of the parameter groups, and acquires an image group which is acquired in the course of execution of the image processing program for each parameter group; a synthesis part that creates a synthetic image from each of a plurality of acquired image groups; a display part that displays the plurality of created synthetic images and displays the plurality of acquired search results to overlap the plurality of synthetic images; and a setting part that sets the parameter group corresponding to the synthetic image selected from the plurality of synthetic images displayed on the display part by an operation in the image processing program.

20 Claims, 12 Drawing Sheets

(56) References Cited

U.S. PATENT DOCUMENTS 9,279,677 B2 * 3/2016 Fujiwara .................. G01C 3/06

* cited by examiner

|  | Fourth bit | Third bit | Second bit | First bit |
| --- | --- | --- | --- | --- |
| First layer (pixel 51A) | 0 | 0 | 0 | 0 |
| Second layer (pixel 52A) | 0 | 0 | 0 | 0 |
| Third layer (pixel 53A) | 0 | 1 | 0 | 0 |
| Fourth layer (pixel 54A) | 1 | 0 | 0 | 0 |
| OR synthesis (pixel 56) | 1 | 1 | 0 | 0 |

FIG. 10

IMAGE PROCESSING DEVICE, SETTING SUPPORT METHOD, AND NON-TRANSITORY COMPUTER-READABLE MEDIA

CROSS-REFERENCE TO RELATED APPLICATION

This application claims the benefit of Japan patent No. 2017-165230, filed on Aug. 30, 2017. The entirety of the above-mentioned patent application is hereby incorporated by reference herein and made a part of this specification.

BACKGROUND

Technical Field

The disclosure relates to a technique of supporting setting of parameters for an image processing program for searching an object from an image.

Description of Related Art

Recently, various image processing programs for searching an object from an image have been developed. For example, Japanese Laid-open No. 2017-041190 (Patent Document 1) discloses a method of detecting a workpiece from an image using an image processing program employing a coarse-to-fine search method. The coarse-to-fine search method is an algorithm of creating an image group having different resolutions from an input image, sequentially searching a search object from an image with a lowest resolution, and searching an object while restricting a search range in an image with a next higher resolution based on the search results for the images.

A user needs to set various parameters for an image processing program employing a coarse-to-fine search method to adjust search accuracy, a processing time, or the like. At this time, the user needs to understand details of the image processing program. However, since internal processes are covered by a block box, the user cannot easily understand what parameters need to be set and in what way. When the number of types of parameters to be set increases, it is more difficult to adjust the parameters. Accordingly, there is demand for a technique of supporting setting of parameters for an image processing program for searching an object from an image.

SUMMARY

According to an embodiment, an image processing device includes: an image acquiring part that acquires an input image including a search object; a program executing part that applies one or more predetermined parameter groups to an image processing program which searches the search object using an image group with different resolutions which is created from the input image, acquires a search result from the image processing program by applying each of the one or more parameter groups, and acquires the image group which is acquired in the course of execution of the image processing program for each of the one or more parameter groups; a synthesis part that creates a synthetic image from each of the acquired one or more image groups; a display part that displays the created one or more synthetic images and displays the acquired one or more search results to overlap the one or more synthetic images; an operation receiving part that receives an operation of selecting any one of the one or more synthetic images displayed on the display part; and a setting part that sets the parameter group corresponding to the synthetic image selected by the operation in the image processing program.

According to an embodiment, a setting support method of supporting setting of parameters for an image processing program includes: a step of acquiring an input image including a search object; a step of applying one or more predetermined parameter groups to an image processing program which searches the search object using an image group with different resolutions which is created from the input image, acquiring a search result from the image processing program for each of the one or more parameter groups, and acquiring the image group which is acquired in the course of execution of the image processing program for each of the one or more parameter groups; a step of creating a synthetic image from each of the acquired one or more image groups; a step of displaying the created one or more synthetic images and displaying the acquired one or more search results to overlap the one or more synthetic images on a display part; a step of receiving an operation of selecting one of the one or more synthetic images displayed on the display part; and a step of setting the parameter group corresponding to the synthetic image selected by the operation in the image processing program.

According to an embodiment, a setting support program for supporting setting of parameters for an image processing program causes an image processing device to perform: a step of acquiring an input image including a search object; a step of applying one or more predetermined parameter groups to an image processing program which searches the search object using an image group with different resolutions which is created from the input image, acquiring a search result from the image processing program for each of the one or more parameter groups, and acquiring the image group which is acquired in the course of execution of the image processing program for each of the one or more parameter groups; a step of creating a synthetic image from each of the acquired one or more image groups; a step of displaying the created one or more synthetic images and displaying the acquired one or more search results to overlap the one or more synthetic images on a display part; a step of receiving an operation of selecting one of the one or more synthetic images displayed on the display part; and a step of setting the parameter group corresponding to the synthetic image selected by the operation in the image processing program.

BRIEF DESCRIPTION OF THE DRAWINGS

FIG. 10 is a diagram schematically illustrating a synthesizing process of a pixel group.

DESCRIPTION OF THE EMBODIMENTS

According to the embodiments, it is possible to support setting of parameters for an image processing program for searching an object from an image.

Hereinafter, embodiments of the invention will be described with reference to the accompanying drawings. In the following description, the same components and elements will be referenced by the same reference signs and have the same names and functions. Accordingly, detailed description thereof will not be repeated. Embodiments and modified examples which will be described below may be appropriately selectively combined.

A. Configuration of Image Processing System 1

Figure 1:
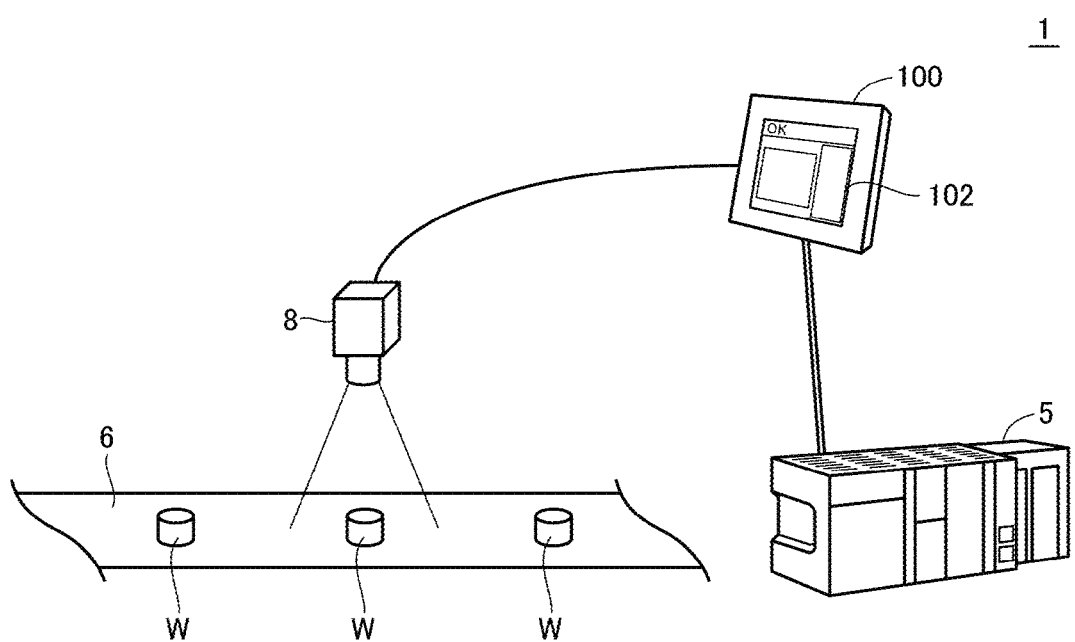
FIG. 1 is a diagram illustrating an example of an entire configuration of an image processing system according to an embodiment.

An entire configuration of an image processing system 1 will be described below with reference to FIG. 1. FIG. 1 is a diagram illustrating an example of the entire configuration of the image processing system 1 according to an embodiment.

The image processing system 1 includes an image processing device 100 that is also referred to as a visual sensor, a programmable logic controller (PLC) 5 that can communicate with the image processing device 100, and an imaging part 8 (an image acquiring part) that is connected to the image processing device 100.

The PLC 5 controls the transport mechanism 6 and the like in cooperation with the image processing device 100. The imaging part 8 of an example further includes a shooting device which are partitioned into a plurality of pixels such as a charge coupled device (CCD) or a complementary metal oxide semiconductor (CMOS) sensor in addition to an optical system such as a lens. The imaging part 8 sequentially images workpieces W which are transported by the transport mechanism 6. An input image which is acquired by shooting by the imaging part 8 is transmitted to the image processing device 100.

The image processing device 100 searches a workpiece W in the input image acquired from the imaging part 8 by executing a predetermined image processing program for searching an object from an image. For example, the image processing device 100 searches a workpiece W from the input image by an image processing program using a coarse-to-fine search method. Hereinafter, the image processing program using a coarse-to-fine search method is also referred to as a "pyramid algorithm." Although details will be described later, the pyramid algorithm creates an image group with different resolutions from the input image and searches the search object sequentially from an image with the lowest resolution in the created image group. At this time, the pyramid algorithm searches an object while restricting a search range in the image with the next higher resolution on the basis of the search result for each image. Hereinafter, the image group with different resolutions which is acquired in the course of execution of the pyramid algorithm is also referred to as a "pyramid image."

The image processing device 100 executes an image processing program for inspection of a defect or stain, measurement of a size, an arrangement direction, and the like of workpieces W, and recognition of characters or figures on the surface of each workpiece W on a workpiece searched from the input image. The execution result is displayed, for example, on a display part 102 of the image processing device 100.

B. Parameter Setting Support

A method of supporting setting of parameters for the pyramid algorithm will be described below with reference to FIGS. 2 and 3.

Figure 2:
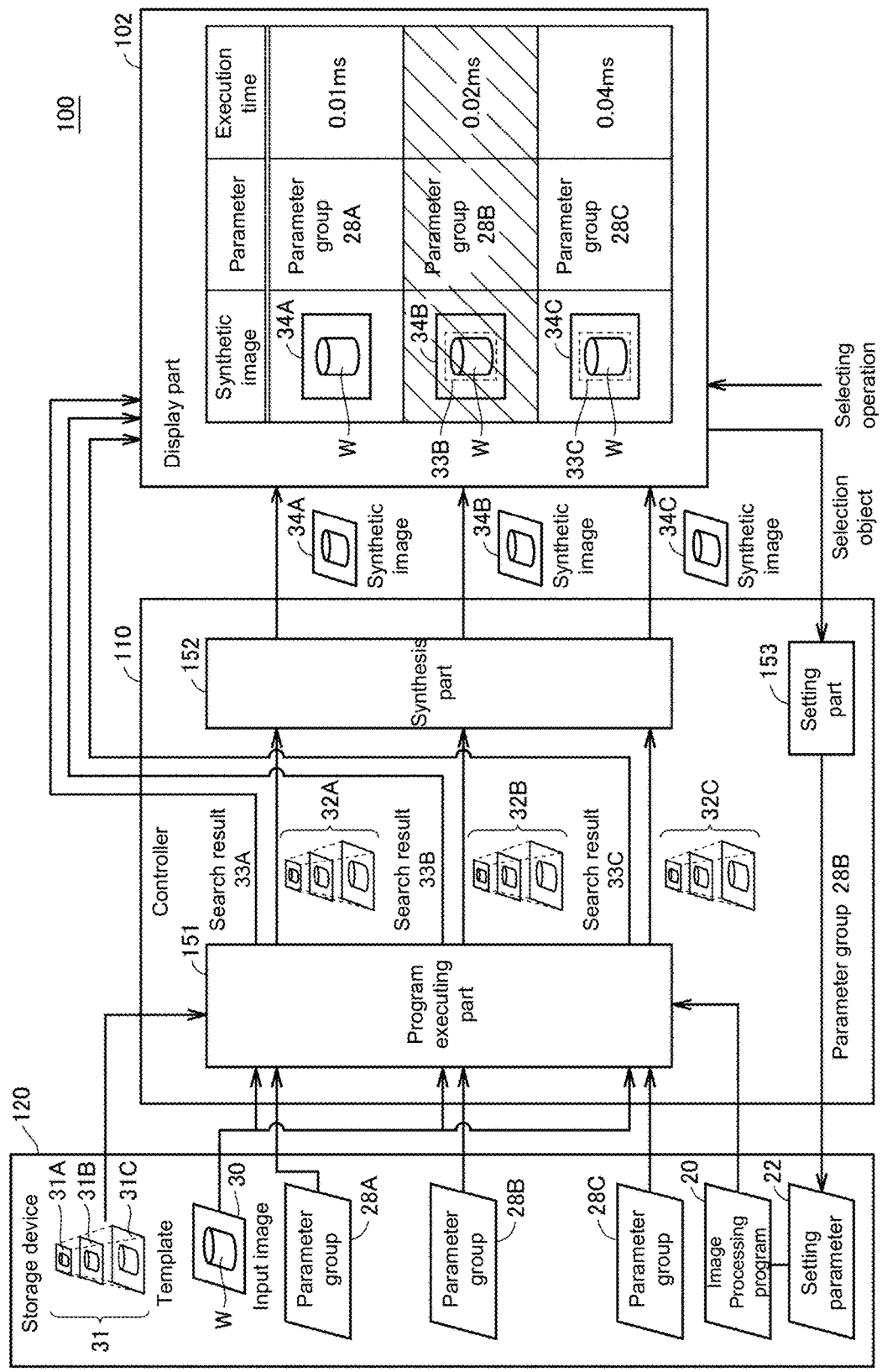
FIG. 2 is a conceptual diagram schematically illustrating support of setting of parameters for a pyramid algorithm.
Figure 3:
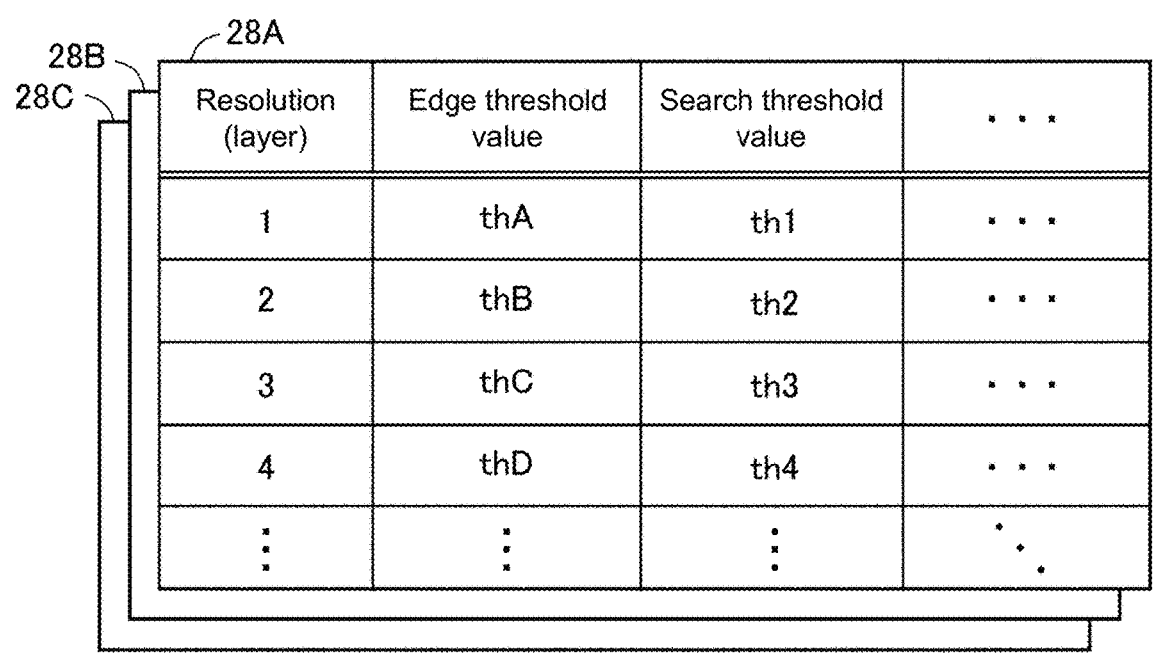
FIG. 3 is a diagram illustrating an example of a data structure of a parameter group.

FIG. 2 is a conceptual diagram schematically illustrating support of setting of parameters for the pyramid algorithm. As illustrated in FIG. 2, the image processing device 100 includes a display part 102, a control device 110, and a storage device 120 as principal hardware.

The control device 110 controls the image processing device 100. The control device 110 includes a program executing part 151 that executes an image processing program 20 and a synthesis part 152 that synthesizes a pyramid image which is created in the course of execution of the pyramid algorithm.

The storage device 120 includes an image processing program 20 for executing a pyramid algorithm, setting parameters 22 that are currently set in the image processing program 20, parameter groups 28A to 28C that serve as candidates which are applied to the image processing program 20, an input image 30 which is acquired by imaging a workpiece W, and a template group 31 that is used to search the workpiece W from the input image 30.

In the following description, the parameter groups 28A to 28C are collectively referred to as parameter groups 28. A "parameter group" mentioned herein refers to a set of parameters which are required for executing the image processing program 20. FIG. 3 is a diagram illustrating an example of a data structure of a parameter group 28. As illustrated in FIG. 3, the parameter group 28 includes a search threshold value group that is used to determine whether a search object is included in each image as a threshold value group which is applied to each image of the pyramid image. The parameter group 28 also includes an edge threshold value group that is used to determine whether each pixel of each image is a pixel indicating an edge as a threshold value group which is applied to each image of the pyramid image. In addition, various parameters which are used at the time of execution of the pyramid algorithm can be defined in the parameter group 28. A method of using the parameter group 28 will be described later.

Referring back to FIG. 2, the template group 31 includes templates 31A to 31C. The templates 31A to 31C may be reference images which are acquired by imaging a workpiece W in advance, or may be features which are extracted as feature portions of the workpiece W from the reference images.

The image processing device 100 according to this embodiment supports setting of parameters for the pyramid algorithm. More specifically, the program executing part 151 applies each of the predetermined parameter groups 28A to 28C to the image processing program 20 for executing the pyramid algorithm, acquires a search result using the image processing program 20 for each parameter group, and acquires pyramid images 32A to 32C which are acquired in the course of execution of the image processing program 20 for each parameter group.

Thereafter, the synthesis part 152 creates synthetic images 34A to 34C from the pyramid images 32A to 32C. The display part 102 displays the created synthetic images 34A to 34C and displays search results 33A to 33C for each parameter group to overlap the synthetic images 34A to 34C.

For example, it is assumed that a workpiece W has not been searched from the input image 30 using the parameter group 28A and a workpiece W has been searched from the input image 30 using the parameter groups 28B and 28C. In this case, the image processing device 100 displays the search results 33B and 33C to overlap only the synthetic images 34B and 34C corresponding to the parameter groups 28B and 28C. Accordingly, a user can easily determine whether each of the parameter groups 28A to 28C is better.

The image processing device 100 is configured to select any one of the displayed synthetic images 34A to 34C. This selecting operation is received, for example, by an operation receiving part (for example, an arbitrary input device such as a mouse, a keyboard, and a touch panel) of the image processing device 100. The image processing device 100 sets the parameter group corresponding to the synthetic image selected by the user's operation as the setting parameter 22 for the image processing program 20. In the example illustrated in FIG. 2, the synthetic image 34B is selected and the parameter group 28B corresponding to the synthetic image 34B is set as the setting parameter 22.

As described above, a user can intuitively understand whether each parameter group is better by visually checking the synthetic images created for the parameter groups and the search results for the parameter groups. Accordingly, the user can select one parameter group with which good search accuracy can be achieved. As a result, a user not having any knowledge of the image processing program 20 can perform setting of an optimal parameter group and can support setting of parameters for the image processing program 20.

In one or some exemplary embodiments, the display part 102 additionally displays evaluated values for the parameter groups 28A to 28C. As the evaluated values, for example, execution times when the parameter groups 28A to 28C are applied to the image processing program 20 are displayed. More specifically, the image processing device 100 has a clocking function of a counter or the like and stores an execution time from start of the image processing program to end of the image processing program for each parameter group. The display part 102 displays the execution time for each parameter group in parallel to the corresponding synthetic image.

In general, the execution time is extended as search accuracy increases, and search accuracy decrease as the execution time is shortened. A user can visually compare such contradictory indices and can select one parameter group in comprehensive consideration of the search accuracy and the execution time. Accordingly, the user can easily set an optimal parameter group that can realize desired search accuracy and a desired execution time.

An example in which the execution time of the image processing program 20 is displayed as the evaluated value for each parameter group has been described above, the evaluated value to be displayed is not limited to the execution time. For example, search accuracy or a detection rate of a search object or the like when each parameter group is applied to the image processing program 20 may be displayed as the evaluated value for each parameter group. More specifically, the image processing device 100 creates a plurality of artificial images on the basis of the input image 30. An artificial image is created, for example, by changing pixel positions of the input image 30 or applying a predetermined environmental variation to the input image 30. The image processing device 100 performs a search process on the created artificial images for the parameter groups. The image processing device 100 identifies the search accuracy or the detection rate by collecting the search results in the artificial images for each parameter group.

FIG. 2 illustrates an example in which three parameter groups 28 are stored, but the number of parameter groups which are prepared in advance is not particularly limited. The number of parameter groups which are prepared in advance is equal to or greater than two.

C. Pyramid Algorithm

Figure 4:
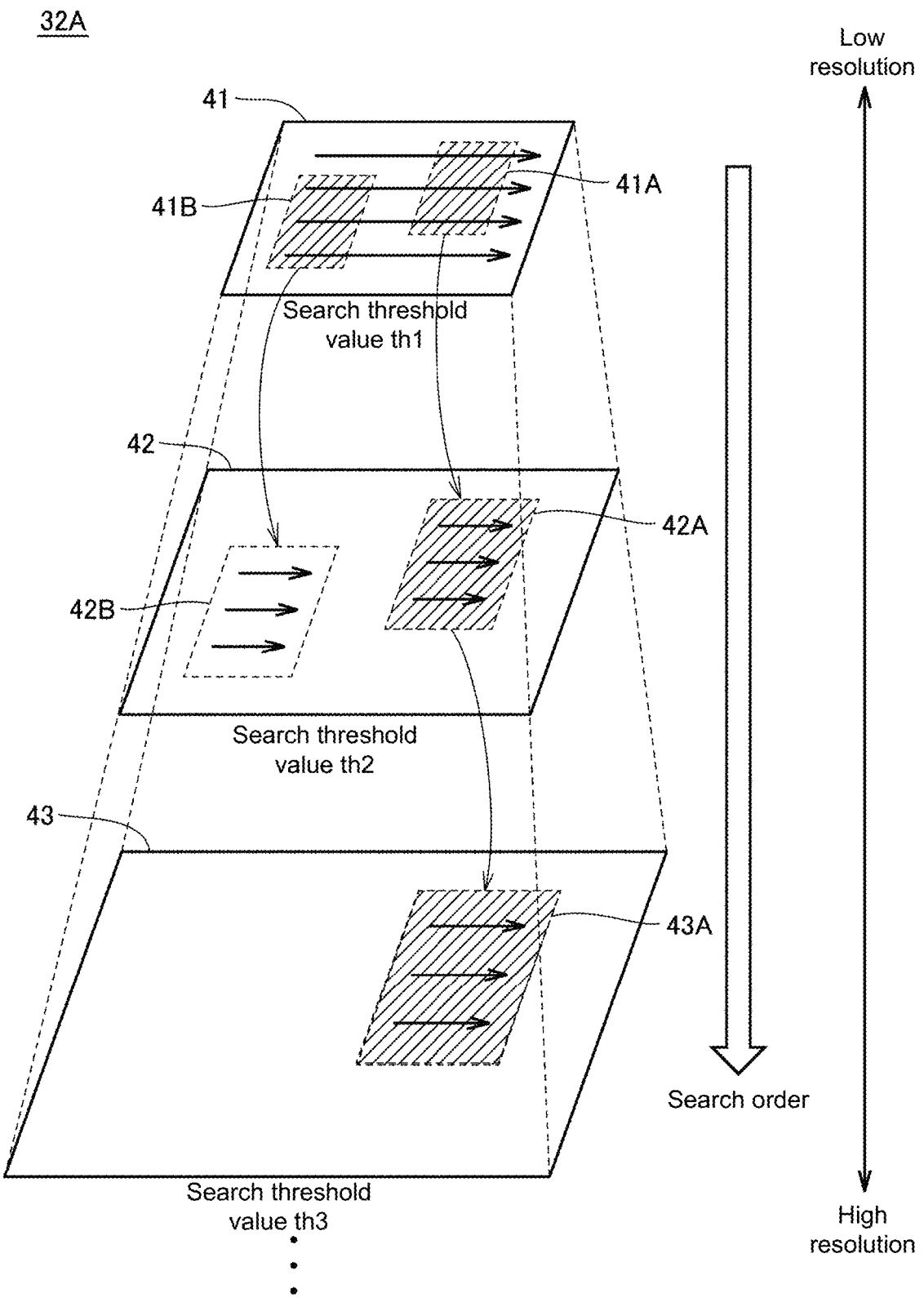
FIG. 4 is a conceptual diagram schematically illustrating a pyramid algorithm.

The pyramid algorithm which is executed by the program executing part 151 will be described below with reference to FIGS. 2 and 4. FIG. 4 is a conceptual diagram schematically illustrating a pyramid algorithm.

As illustrated in FIG. 4, the program executing part 151 creates an image group with different resolutions (that is, a pyramid image 32A) from the input image 30. In other words, the program executing part 151 reduces the input image 30 by a predetermined magnification (for example, a half times) and creates an image at each reduction ratio as the pyramid image 32A. In the example illustrated in FIG. 4, the pyramid image 32A is created from the input image 30, and the pyramid image 32A includes images 41 to 43 (an image group) with different resolutions.

The program executing part 151 searches a search object sequentially from the image with a lowest resolution among the images 41 to 43. More specifically, the program executing part 151 acquires a template 31A corresponding to the resolution of the image 41 from the template group 31. The program executing part 151 scans the image 41 with the template 31A and calculates a degree of similarity between each area in the image 41 and the template 31A. An arbitrary algorithm such as sum of square difference (SSD), sum of absolute difference (SAD), normalized cross-correlation (NCC), or zero-mean normalized cross-correlation (ZNCC) is employed as the method of calculating the degree of similarity. The program executing part 151 identifies an image area of which the degree of similarity is greater than the search threshold value th1 of the parameter group 28A among the image areas in the search range, and sets the image area as a candidate including the search object. In the example illustrated in FIG. 4, the image areas 41A and 41B are identified as candidates of the image area including the search object.

Then, the program executing part 151 acquires a template 31B corresponding to the resolution of the image 42 from the template group 31. Thereafter, the program executing part 151 sets image areas 42A and 42B corresponding to the image areas 41A and 41B which are specified as candidates including the search object as a search range. The program executing part 151 program executing part 151 scans the image areas 42A and 42B with the template 31B and calculates degrees of similarity between areas in the image areas 42A and 42B and the template 31B. The program executing part 151 identifies an image area in which the degree of similarity is greater than a search threshold value th2 of the parameter group 28A among the image areas in the search range and sets the image area as a candidate including the search object. In the example illustrated in FIG. 4, the image area 42A is identified as a candidate including the search object.

Then, the program executing part 151 acquires a template 31C corresponding to the resolution of the image 43 from the template group 31. Thereafter, the program executing part 151 sets an image area 43A corresponding to the image area 42A which is specified as a candidate including the search object as a search range. The program executing part 151 scans the image area 43A with the template 31C and calculates degrees of similarity between areas in the image area 43A and the template 31C. The program executing part 151 identifies an image area in which the degree of similarity is greater than a search threshold value th3 of the parameter group 28A among the image areas in the search range and sets the image area as a candidate including the search object.

In this way, the program executing part 151 searches a search object sequentially from the image with a lowest resolution among the images of the pyramid image, and searches the search object while restricting the search range in an image with a next higher resolution on the basis of the search results in the images. A finally left candidate is output as the search result. For example, the search result is expressed as coordinate values in the input image 30.

In the example illustrated in FIG. 2, the program executing part 151 outputs the pyramid image 32A and the search result 33A as a result of application of the parameter group 28A to the image processing program 20. Similarly, the program executing part 151 outputs the pyramid image 32B and the search result 33B as a result of application of the parameter group 28B to the image processing program 20. Similarly, the program executing part 151 outputs the pyramid image 32C and the search result 33C as a result of application of the parameter group 28C to the image processing program 20. The pyramid images 32A to 32C are output to the synthesis part 152 and the search results 33A to 33C are output to the display part 102.

D. Synthesizing Process

Figure 5:
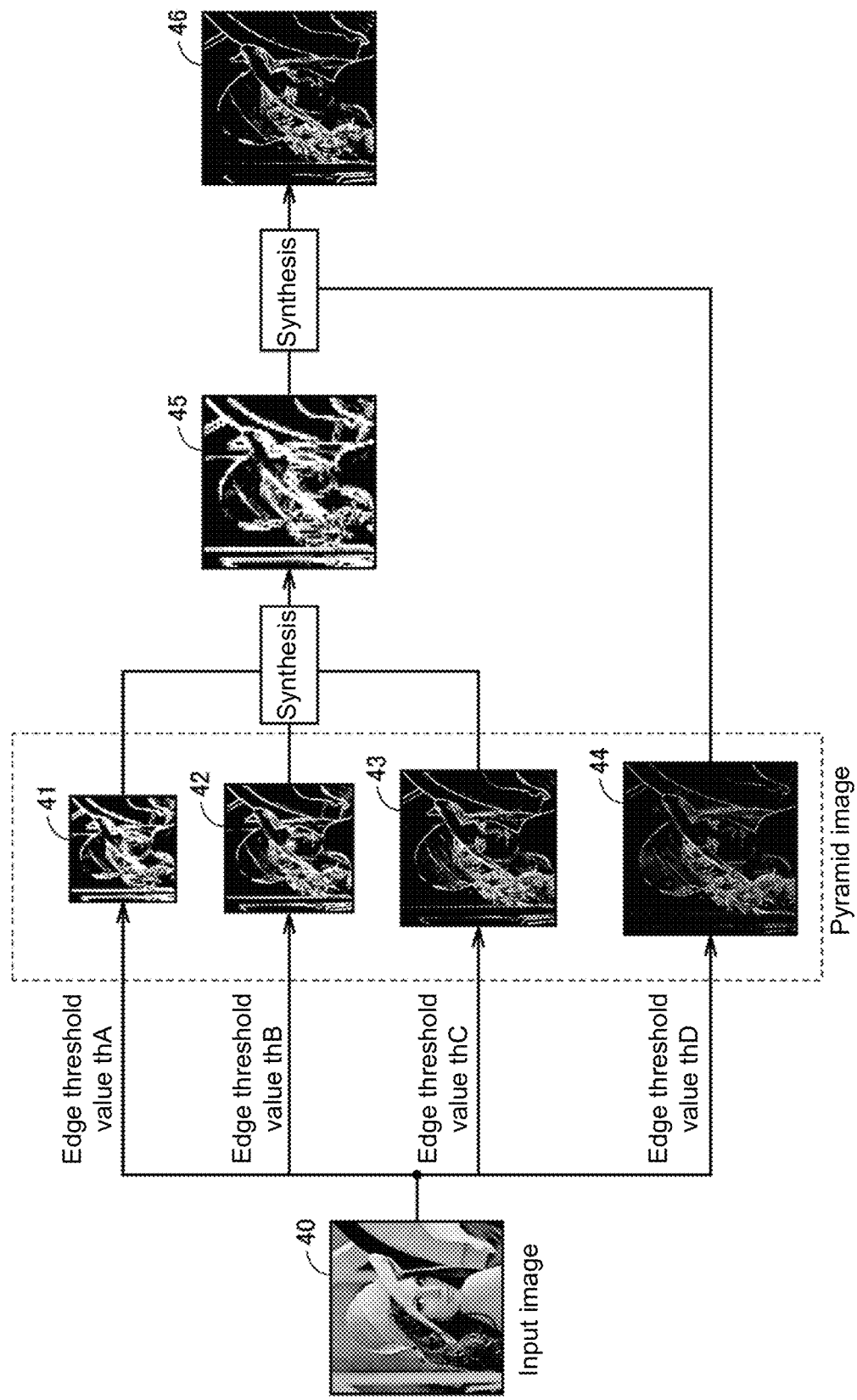
FIG. 5 is a conceptual diagram schematically illustrating a pyramid image synthesizing process which is performed by a synthesis part.
Figure 6:
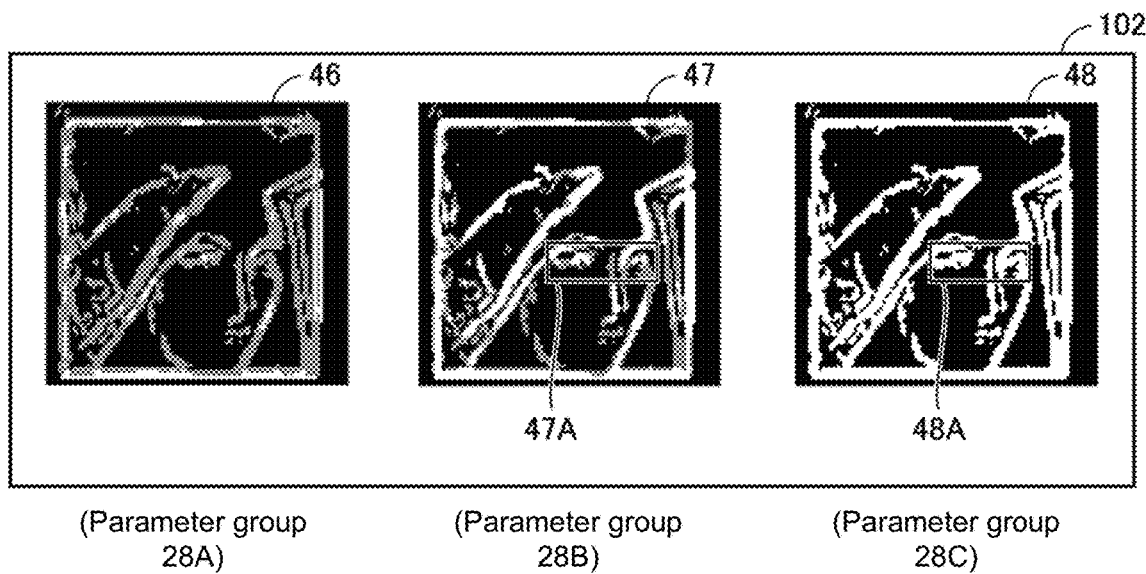
FIG. 6 is a diagram illustrating an example of a display mode in a display part.

A process of synthesizing a pyramid image which is performed by the synthesis part 152 will be described below with reference to FIGS. 2, 5, and 6. FIG. 5 is a conceptual diagram schematically illustrating the process of synthesizing a pyramid image which is performed by the synthesis part 152.

In the example illustrated in FIG. 5, a synthesizing process is performed on a pyramid image in which a person appears, but the synthesizing process may be performed on a pyramid image in which a workpiece appears.

Images 41 to 44 which are created from the input image 40 are illustrated in FIG. 5. The images 41 to 44 are acquired by applying an edge extracting filter such as a differential filter to a pyramid image created from the input image 40. In the example illustrated in FIG. 5, the images 41 to 44 are binarized into an edge portion and a non-edge portion on the basis of edge threshold values thA to thD of the parameter groups 28, where the edge portion is expressed in white and the non-edge portion is expressed in black. Typically, a pixel value of the edge portion is defined as "1" and a pixel value of the non-edge portion is defined as "0."

The synthesis part 152 creates an intermediate image 45 from the images 41 to 43, and creates a synthetic image 46 from the intermediate image 45 and the image 44. More specifically, the synthesis part 152 adjusts the sizes of the images 41 to 43 and then synthesizes pixel values at the same coordinates to create the intermediate image 45. The synthesizing process employs an arbitrary operation such as an AND operation, an OR operation, or an addition operation.

Thereafter, the synthesis part 152 adjusts the sizes of the image 44 and the intermediate image 45 and synthesizes the image 44 and the intermediate image 45 to create a synthetic image 46. At this time, the synthesis part 152 creates the synthetic image 46 such that differences in pixel values between the image 44 and the intermediate image 45 are displayed. Edges are likely to be lost in the images 41 to 43 with low resolutions. For the synthetic image 46, the synthetic image 46 can be generated by identifying the lost edges. For example, the pixel value in the synthetic image 46 is "2" in portions indicating a valid edge in both the image 44 and the intermediate image 45, is "1" in portions indicating a valid edge in the image 44 and indicating an invalid edge in the intermediate image 45, and is "0" in portions having an invalid edge in both the image 44 and the intermediate image 45.

E. Display Process

A display process which is performed by the display part 102 will be described below with reference to FIG. 6. FIG. 6 is a diagram illustrating a display mode of the display part 102.

The display part 102 displays synthetic images 46 to 48 which are created for the parameter groups 28A to 28C by the synthesis part 152. As described above, the synthetic images 46 to 48 are created such that edges lost in the course of execution of the pyramid algorithm can be identified. The display part 102 displays the synthetic images 46 to 48 in a mode in which such lost edge portions can be identified. In the example illustrated in FIG. 6, an edge portion not lost in the course of execution of the pyramid algorithm is displayed in white, and an edge portion lost in the course of execution of the pyramid algorithm is displayed in gray, and the other portions are displayed in black. This difference may be displayed in different colors. By this display, a user can easily understand a reason for a bad search result and can easily determine suitability of each parameter group.

The display part 102 displays the search result of the pyramid algorithm for each parameter group on the corresponding synthetic image. For example, it is assumed that a search object (for example, an eye) has not been searched with the parameter group 28A and the search object has been searched with the parameter groups 28B and 28C. In this case, the display part 102 does not display the search result for the synthetic image 46 corresponding to the parameter group 28A and displays search results 47A and 48A on only the synthetic images 47 and 48 corresponding to the parameter groups 28B and 28C.

F. Modified Example

FIG. 5 illustrates an example in which the synthesis part 152 creates the intermediate image 45 from some images 41 to 43 of the pyramid image and creates the synthetic image 46 from the other image 44 and the intermediate image 45, but the synthesis method which is performed by the synthesis part 152 is not limited to the example illustrated in FIG. 5. For example, the synthesis part 152 may create the synthetic image 46 without creating the intermediate image 45. In this case, the synthesis part 152 adjusts the resolutions of the images constituting the pyramid image and then creates a synthetic image from the image group.

Hereinafter, first and second modified examples of the synthesizing process which is performed by the synthesis part 152 will be sequentially described.

Figure 7:
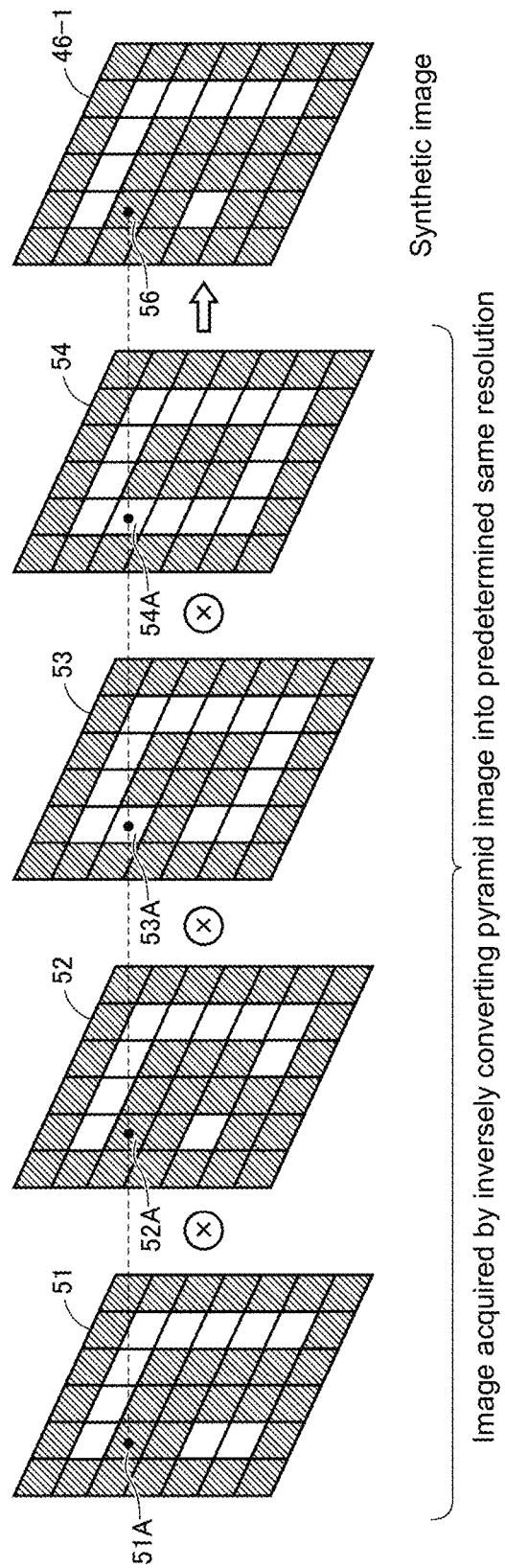
FIG. 7 is a conceptual diagram schematically illustrating a synthesizing process according to a first modified example.

FIG. 7 is a conceptual diagram schematically illustrating a synthesizing process according to the first modified example. In FIG. 7, images 51 to 54 obtained by inversely converting the pyramid image (for example, the images 41 to 44) with a predetermined same resolution (a same size) are illustrated. The images 51 to 54 are binarized into an edge portion and a non-edge portion, where the edge portion is displayed in white and the non-edge portion is hatched. Typically, the pixel value of the edge portion is defined as "1" and the pixel value of the non-edge portion is defined as "0."

The synthesis part 152 performs an AND operation on the pixels values at the same coordinates in the binarized images 51 to 54 and creates a synthetic image 46-1 as the result of the AND operation. For example, paying attention to pixels 51A to 54A at the same coordinates in the images 51 to 54, since the pixel value of the pixel 51A is "0," the pixel value of the pixel 52A is "0," the pixel value of the pixel 53A is "1," and the pixel value of the pixel 54A is "1," the result of the AND operation is "0." As a result, a pixel 56 in the synthetic image 46-1 corresponding to the pixels 51A to 54A has a pixel value of "0." The synthesis part 152 performs this AND operation on all the pixels.

In this way, the synthesis part 152 performs the AND operation on the pixels at the same coordinates in the images 51 to 54 of the same resolutions and outputs a synthetic image 46-1 as the result of the AND operation. A user can easily understand a portion indicating a valid edge in all the layers by confirming the synthetic image 46-1 subjected to the AND operation. Alternatively, a user can easily understand a portion indicating an invalid edge in some of the layers.

Figure 8:
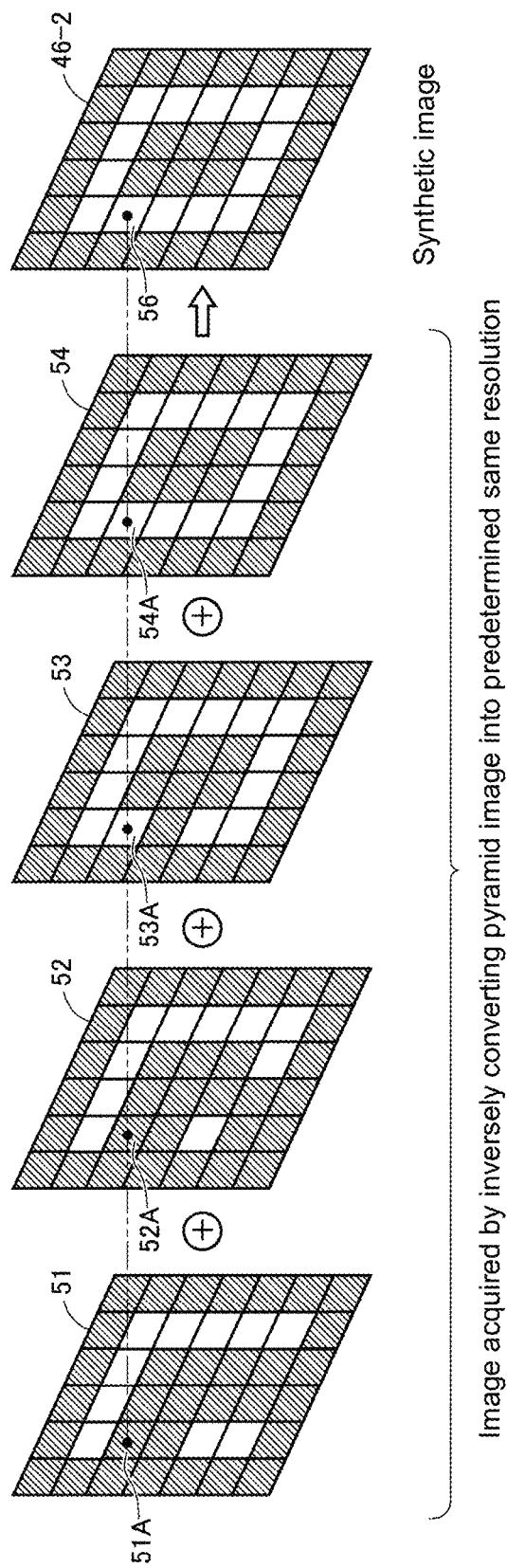
FIG. 8 is a conceptual diagram schematically illustrating a synthesizing process according to a second modified example.

FIG. 8 is a conceptual diagram schematically illustrating a synthesizing process according to the second modified example. The same images 51 to 54 as illustrated in FIG. 7 are illustrated in FIG. 8.

In this modified example, the synthesis part 152 performs an OR operation on the pixels values at the same coordinates in the binarized images 51 to 54 and creates a synthetic image 46-2 as the result of the OR operation. For example, paying attention to pixels 51A to 54A at the same coordinates in the images 51 to 54, since the pixel value of the pixel 51A is "0," the pixel value of the pixel 52A is "0," the pixel value of the pixel 53A is "1," and the pixel value of the pixel 54A is "1," the result of the OR operation is "1." As a result, a pixel 56 in the synthetic image 46-2 corresponding to the pixels 51A to 54A has a pixel value of "1." The synthesis part 152 performs this OR operation on all the pixels.

In this way, the synthesis part 152 performs the OR operation on the pixels at the same coordinates in the images 51 to 54 of which the resolutions are arranged and outputs a synthetic image 46-2 as the result of the OR operation. A user can easily understand a portion indicating a valid edge in part by confirming the synthetic image 46-2 subjected to the OR operation. Alternatively, a user can easily understand a portion indicating an invalid edge in all the layers.

Figure 9:
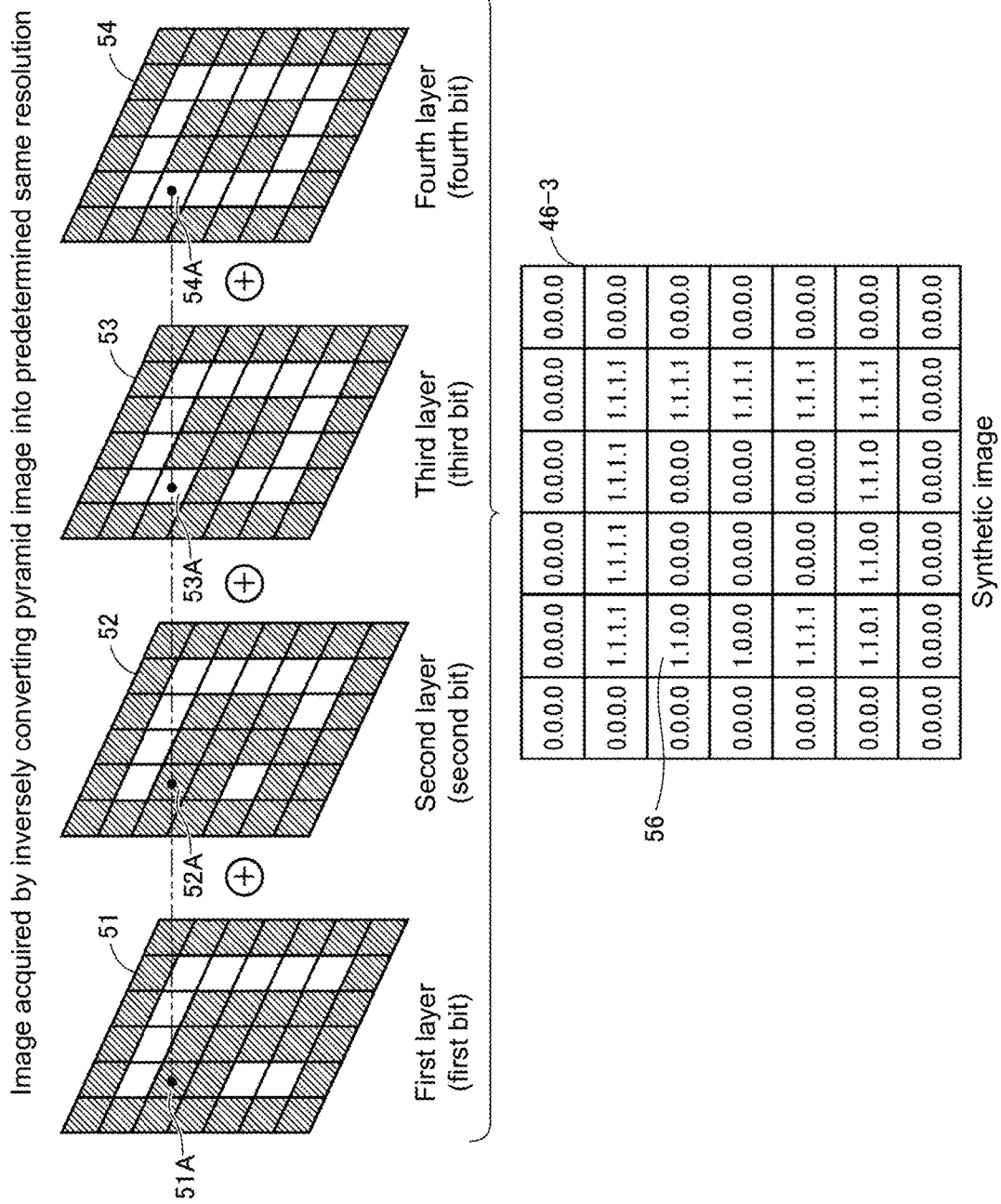
FIG. 9 is a conceptual diagram schematically illustrating a synthesizing process according to a third modified example.

FIG. 9 is a conceptual diagram schematically illustrating a synthesizing process according to the third modified example. The same images 51 to 54 as illustrated in FIG. 7 are illustrated in FIG. 9.

In this modified example, the synthesis part 152 synthesizes the pixels values at the same coordinates in the images 51 to 54 of the same resolutions such that information of the pixel values is not lost, and outputs a synthetic image 46-3 as the synthesis result. More specifically, bit strings with at least the same number of bits as in the images 51 to 54 are allocated to the pixels of synthetic image 46-3. A pixel value of a corresponding pixel in the image 51 corresponding to a first layer of the pyramid image is reflected in the first bit of each pixel of the synthetic image 46-3. A pixel value of a corresponding pixel in the image 52 corresponding to a second layer of the pyramid image is reflected in the second bit of each pixel of the synthetic image 46-3. A pixel value of a corresponding pixel in the image 53 corresponding to a third layer of the pyramid image is reflected in the third bit of each pixel of the synthetic image 46-3. A pixel value of a corresponding pixel in the image 54 corresponding to a fourth layer of the pyramid image is reflected in the fourth bit of each pixel of the synthetic image 46-3.

For example, the synthesizing process according to this modified example will be described with a focus on the pixels 51A to 54A at the same coordinates in the images 51 to 54. FIG. 10 is a diagram schematically illustrating the process of synthesizing the pixels 51A to 54A.

A bit string with the same number of bits as in the images 51 to 54 is allocated to the pixel 56 in the synthetic image 46-3 at the same coordinates as the pixels 51A to 54A. In the example illustrated in FIG. 10, a bit string of four bits is allocated to the pixel 56 in the synthetic image 46-3. The value of the pixel 51A in the image 51 of the first layer is reflected in the first bit of the pixel 56 in the synthetic image 46-3. For example, when the pixel 51A has a pixel value of "0," "0" is reflected in the first bit of the pixel 56. The value of the pixel 52A in the image 52 of the second layer is reflected in the second bit of the pixel 56 in the synthetic image 46-3. For example, when the pixel 52A has a pixel value of "0," "0" is reflected in the second bit of the pixel 56. The value of the pixel 53A in the image 53 of the third layer is reflected in the third bit of the pixel 56 in the synthetic image 46-3. For example, when the pixel 53A has a pixel value of "1," "1" is reflected in the third bit of the pixel 56. The value of the pixel 54A in the image 54 of the fourth layer is reflected in the fourth bit of the pixel 56 in the synthetic image 46-3. For example, when the pixel 54A has a pixel value of "1," "1" is reflected in the fourth bit of the pixel 56. As a result, the bit string of the pixel 56 of the synthetic image 46-3 is (1, 1, 0, 0).

The synthesis part 152 performs this synthesizing process on the pixels at the same coordinates in the images 51 to 54. As a result, the synthetic image 46-3 illustrated in FIG. 9 is created. By this synthesizing process, the synthesis part 152 can synthesize the binarized images 51 to 54 such that information of the pixel values of the pixels is not lost.

The image processing device 100 displays the created synthetic image 46-3 in a predetermined display mode. For example, the image processing device 100 displays the synthetic image 46-3 while changing a gradation depending on the pixel value. Alternatively, different colors are correlated with the pixel values in advance, and the image processing device 100 displays the synthetic image 46-3 while changing the color depending on the pixel value. By displaying the synthetic image 46-3 in this way, a user can easily confirm in what layer edge information has been lost and can easily perform program analysis.

The above-description is based on the premise that the synthesis part 152 performs binarization and then creates the synthetic image 46, but the synthesis part 152 may create the synthetic image 46 without performing binarization. In this case, the synthesis part 152 aligns the resolutions of the pyramid image created from the input image 40 and then synthesizes the pixel values at the same coordinates. The synthesizing process employs an arbitrary operation such as a MAX operation using a maximum pixel value, a MIN operation using a minimum pixel value, or an addition operation of pixel values.

In one or some exemplary embodiments, the image processing device 100 stores binarization results of the images 51 to 54 which are the layers. Accordingly, it is possible to easily interpret in which layer an edge is valid or invalid.

G. Configuration of Image Processing Device 100

Figure 11:
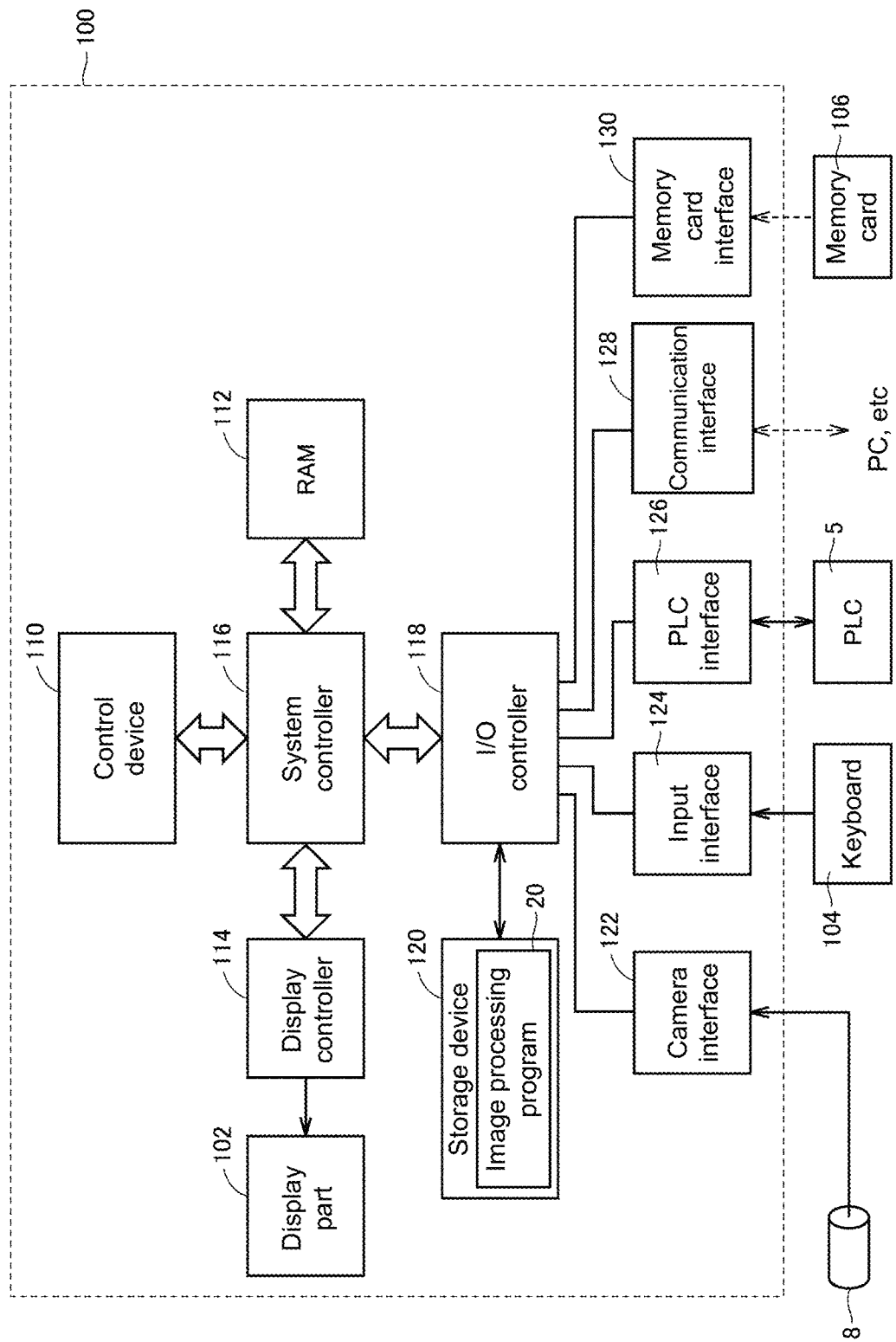
FIG. 11 is a diagram schematically illustrating an example of a hardware configuration of an image processing device according to the embodiment.

A hardware configuration of the image processing device 100 illustrated in FIG. 1 will be described below with reference to FIG. 11. FIG. 11 is a diagram schematically illustrating an example of the hardware configuration of the image processing device 100 according to the embodiment.

The image processing device 100 has a structure based on a general computer architecture and implements various image processing which will be described later by causing a processor to execute a program which has been previously installed.

More specifically, the image processing device 100 includes a control device 110 such as a central processing unit (CPU) or a micro-processing unit (MPU), a random access memory (RAM) 112, a display controller 114, a system controller 116, an input/output (I/O) controller 118, a storage device 120, a camera interface 122, an input interface 124, a PLC interface 126, a communication interface 128, and a memory card interface 130. These parts are connected to each other with the center on the system controller 116 such that data communication with each other is possible.

The control device 110 implements a target calculation process by exchanging programs (codes) with the system controller 116 and executing the programs in a predetermined sequence. The system controller 116 is connected to the control device 110, the Ram 112, the display controller 114, and the I/O controller 118 via a bus, exchanges data with the parts, and controls the entire processes of the image processing device 100.

The Ram 112 is typically a volatile memory such as a dynamic random access memory (DRAM) and holds a program read from the storage device 120, an input image acquired by the imaging part 8, a process result on the input image, workpiece data, and the like.

The display controller 114 is connected to the display part 102 and outputs signals for displaying a variety of information to the display part 102 in accordance with an internal command from the system controller 116. The display part 102 includes, for example, a liquid crystal display, or an organic electroluminescence (EL) display.

The I/O controller 118 controls data exchange with a recording medium or an external device which is connected to the image processing device 100. More specifically, the I/O controller 118 is connected to the storage device 120, the camera interface 122, the input interface 124, the PLC interface 126, the communication interface 128, and the memory card interface 130.

The storage device 120 is typically a nonvolatile magnetic storage device and stores various setting values and the like in addition to the image processing program 20 which is executed by the control device 110. An input image acquired from the imaging part 8 is stored in the storage device 120. A semiconductor memory device such as a flash memory or an optical memory device such as a digital versatile disk random access memory (DVD-RAM) may be employed instead of the storage device 120.

The camera interface 122 corresponds to an input part that receives image data which is generated by imaging a workpiece W (a search object), and relays data transmission between the control device 110 and the imaging part 8. More specifically, the camera interface 122 can be connected to one or more imaging parts 8, and an imaging instruction is output from the control device 110 to the imaging part 8 via the camera interface 122. Accordingly, the imaging part 8 shoots a subject and outputs a created image to the control device 110 via the camera interface 122.

The input interface 124 relays data transmission between the control device 110 and an input device such as a keyboard 104, a mouse, a touch panel, and a dedicated console. That is, the input interface 124 receives an operation command which is issued in response to a user' operation of the input device.

The PLC interface 126 relays data transmission between the control device 110 and the PLC 5. More specifically, the PLC interface 126 transmits information relevant to a production line state which is controlled by the PLC 5, information relevant to a workpiece W, or the like to the control device 110.

The communication interface 128 relays data transmission between the control device 110 and another personal computer or a server device which is not illustrated. The communication interface 128 typically includes Ethernet (registered trademark), a universal serial bus (USB), or the like. As will be described later, a program downloaded from a delivery server or the like may be installed in the image processing device 100 via the communication interface 128 instead of installing a program stored in the memory card 106 in the image processing device 100. For example, the communication interface 128 receives a signal indicating a state of the imaging part 8 from the imaging part 8, the PLC 5, or the like. The signal indicates whether the imaging part 8 is taking an image.

The memory card interface 130 relays data transmission between the control device 110 and the memory card 106 which is a computer readable recording medium. That is, the memory card 106 is distributed in a state in which the image processing program 20 which is executed by the image processing device 100 is stored, and the memory card interface 130 reads the image processing program 20 from the memory card 106. The memory card interface 130 writes a camera image acquired by the imaging part 8 and/or process results in the image processing device 100 to the memory card 106 in response to an internal command of the control device 110. The memory card 106 includes a general-purpose semiconductor memory device such as a secure digital (SD), a magnetic recording medium such as a flexible disk, or an optical recording medium such as a compact disk read only memory (CD-ROM).

When a computer having the structure based on a general computer architecture is used, an operating system (OS) for providing basic functions of the computer may be installed in the computer in addition to applications for providing functions associated with the embodiment. In this case, the image processing program according to this embodiment may be a program that calls a necessary module among program modules provided as a part of the OS in a predetermined sequence and/or time and execute a processing. That is, the program itself according to the embodiment may not include the above-mentioned module and processing may be performed in cooperation with the OS. Accordingly, the image processing program according to the embodiment may not include some modules.

The image processing program according to the embodiment may be incorporated as a part of another program and be provided. In this case, the program itself does not include a module included in the other program which can be combined as described above and processing is performed in cooperation with the other program. That is, the image processing program according to the embodiment may be incorporated into another program.

Alternatively, some or all of functions which are provided by executing the image processing program may be embodied as a dedicated hardware circuit.

H. Control Structure of Image Processing Device 100

Figure 12:
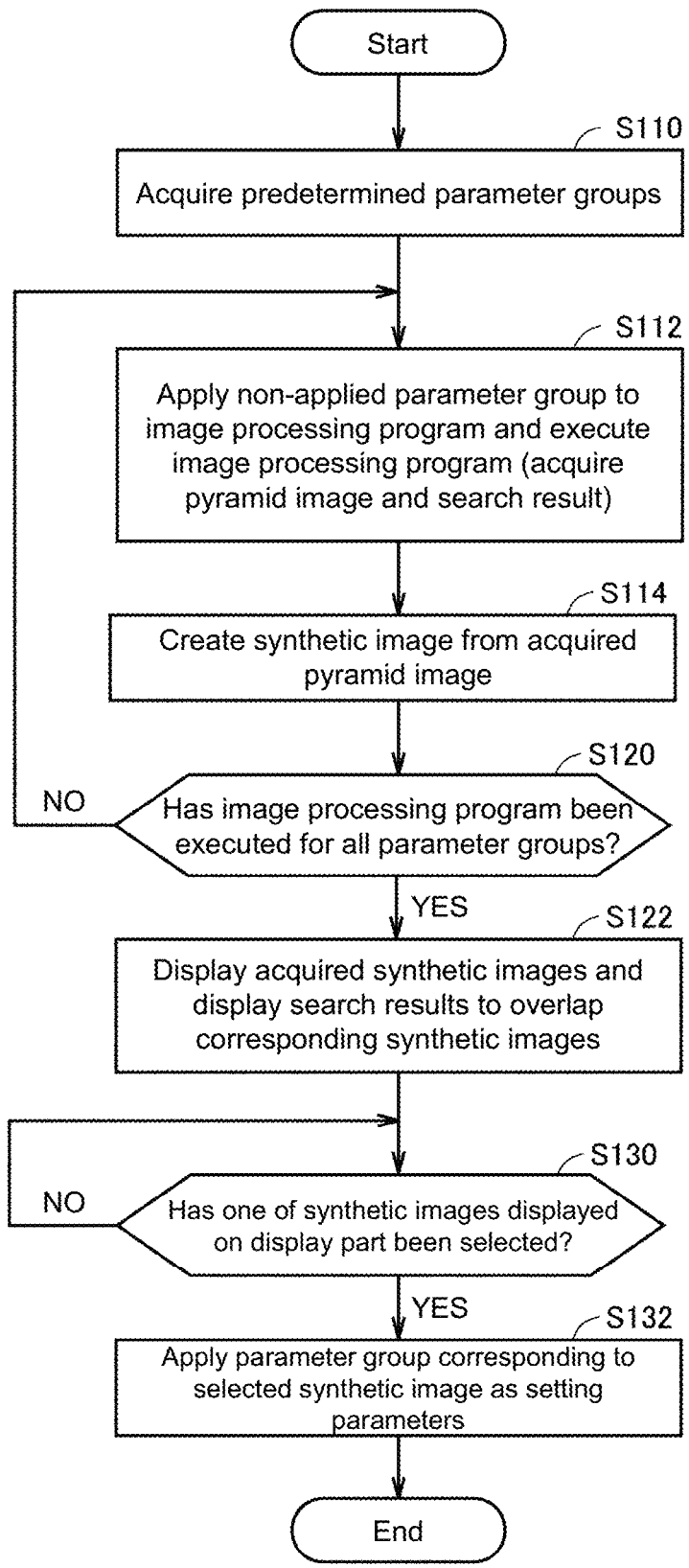
FIG. 12 is a flowchart schematically illustrating a part of processes which are performed by the image processing device according to the embodiment.

A control structure of the image processing device 100 will be described below with reference to FIG. 12. FIG. 12 is a flowchart illustrating a part of a process routine which is performed by the image processing device 100. The process routine illustrated in FIG. 12 is embodied by causing the control device 110 of the image processing device 100 to execute a program. In another embodiment, some or all of the process routine may be embodied by a circuit element or other hardware.

In Step S110, the control device 110 acquires a plurality of parameter groups serving as candidates which are set in the image processing program 20. The candidates for the parameter groups may be prepared in advance, may be arbitrarily set by a user, or may be randomly set.

In Step S112, the control device 110 serves as the program executing part 151 (see FIG. 2) and applies a not-applied parameter group among the parameter groups acquired in Step S110 to the image processing program 20. Thereafter, the control device 110 executes the image processing program 20 and acquires a pyramid image created in the course of the execution and search results as execution results. In one or some exemplary embodiments, the control device 110 additionally acquires an execution time from start of execution of the image processing program 20 to end of the execution.

In Step S114, the control device 110 serves as the synthesis part 152 (see FIG. 2) and creates a synthetic image from the pyramid image acquired in Step S112. The method of creating a synthetic image is the same as described above with reference to FIGS. 5, 7, and 8 and thus description thereof will not be repeated.

In Step S120, the control device 110 determines whether the image processing program 20 has been executed for all the parameter groups acquired in Step S110. When it is determined that the image processing program 20 has been executed for all the parameter groups (YES in Step S120), the control device 110 switches the control routine to Step S122. Otherwise (NO in Step S120), the control device 110 returns the control routine to Step S112.

In Step S122, the control device 110 displays the synthetic images acquired as the result of application of the parameter groups on the display part 102, and displays the search results for the parameter groups on the display part 102 to overlap the corresponding synthetic images.

In Step S130, the control device 110 determines whether one of the synthetic images displayed on the display part 102 has been selected. This selecting operation is received by an operation receiving part (for example, an arbitrary input device such as a mouse, a keyboard, or a touch panel) of the image processing device 100. When it is determined that one of the synthetic images displayed on the display part 102 has been selected (YES in Step S130), the control device 110 switches the control routine to Step S132. Otherwise (NO in Step S130), the control device 110 performs the process of Step S130 again.

In Step S132, the control device 110 serves as the setting part 153 (see FIG. 2) and applies the parameter group corresponding to the selected synthetic image as setting parameters.

I. Conclusion

As described above, the image processing device 100 applies a plurality of predetermined parameter groups to the image processing program 20 for executing a pyramid algorithm. The image processing device 100 acquires a search result of the image processing program 20 for each parameter group and acquires a pyramid image which is obtained in the course of execution of the image processing program for each parameter group.

Thereafter, the image processing device 100 creates a synthetic image from the pyramid image acquired for each parameter group, displays the synthetic images, and displays the search result for each parameter group to overlap the corresponding synthetic image. The image processing device 100 is configured to select one of the displayed synthetic images. The image processing device 100 sets the parameter group corresponding to the selected synthetic image as the setting parameter 22 of the image processing program 20.

A user can intuitively understand whether each parameter group is better by visually confirming the synthetic images and the search results. Then, the user can select the parameter group with which good search accuracy can be obtained. Accordingly, a user not having any knowledge of the image processing program 20 can set an optical parameter group and can support setting of parameters for the image processing program 20. These can act particularly effectively when the number of types of parameters to be set is large or when the total number of pyramid images is large.

The above-disclosed embodiments should be understood to be merely exemplary, but not restrictive in all aspects. The scope of the invention is defined by the appended claims, not by the above description, and is intended to include all modifications within meanings and scopes equivalent to the scope of the claims.

According to an embodiment, the image processing program searches the search object sequentially from an image with a lowest resolution in the image group with different resolutions which is created from the input image and searches the search object while restricting a search range in an image with a next higher resolution on the basis of the search result in each image.

According to an embodiment, the parameter group which is applied to the image processing program includes a threshold value group that is used to determine whether the search object is included in each image as the threshold value group which is applied to each image of the image group with different resolutions which is created from the input image.

According to an embodiment, the display part additionally displays an evaluated value for each of the one or more parameter groups.

According to an embodiment, the synthesis part adjusts the resolutions of the image group with different resolutions which is created from the input image and then creates a synthetic image from the image group.

According to an embodiment, the image processing program binarizes the image group with different resolutions which is created from the input image into pixels indicating an edge and pixels not indicating an edge. The synthesis part aligns the resolutions of the binarized image group, performs an AND operation on pixel values at the same coordinates in the image group, and outputs the synthesis image as the result of the AND operation.

According to an embodiment, the image processing program binarizes the image group with different resolutions which is created from the input image into pixels indicating an edge and pixels not indicating an edge. The synthesis part aligns the resolutions of the binarized image group, performs an OR operation on pixel values at the same coordinates in the image group, and outputs the synthesis image as the result of the OR operation.

According to an embodiment, the image processing program binarizes the image group with different resolutions which is created from the input image into pixels indicating an edge and pixels not indicating an edge. The synthesis part aligns the resolutions of the binarized image group, synthesizes pixels at the same coordinates in the image group such that information of pixel values is not lost, and outputs the synthesis image as the result of the synthesis.

According to an embodiment, the parameter group which is applied to the image processing program includes a threshold value group that is used to determine whether each pixel in each image is a pixel indicating an edge as a threshold value group which is applied to each image of the image group with different resolutions which is created from the input image.

What is claimed is:

1. An image processing device comprising:
    an image acquiring part that acquires an input image including a search object;
    a program executing part that applies one or more predetermined parameter groups to an image processing program which searches the search object using an image group with different resolutions which is created from the input image, acquires a search result from the image processing program for each of the one or more parameter groups, and acquires the image group which is acquired in the course of execution of the image processing program for each of the one or more parameter groups;
    a synthesis part that creates a synthetic image from each of the acquired one or more image groups;
    a display part that displays the created one or more synthetic images and displays the acquired one or more search results to overlap the one or more synthetic images;
    an operation receiving part that receives an operation of selecting one of the one or more synthetic images displayed on the display part; and
    a setting part that sets the parameter group corresponding to the synthetic image selected by the operation in the image processing program.

2. The image processing device according to claim 1, wherein the synthesis part adjusts the resolutions of the image group with different resolutions which is created from the input image and then creates a synthetic image from the image group.

3. The image processing device according to claim 1, wherein the display part additionally displays an evaluated value for each of the one or more parameter groups.

4. The image processing device according to claim 3, wherein the synthesis part adjusts the resolutions of the image group with different resolutions which is created from the input image and then creates a synthetic image from the image group.

5. The image processing device according to claim 1, wherein the image processing program searches the search object sequentially from an image with a lowest resolution in the image group with different resolutions which is created from the input image and searches the search object while restricting a search range in an image with a next higher resolution on the basis of the search result in each image.

6. The image processing device according to claim 5, wherein the synthesis part adjusts the resolutions of the image group with different resolutions which is created from the input image and then creates a synthetic image from the image group.

7. The image processing device according to claim 5, wherein the display part additionally displays an evaluated value for each of the one or more parameter groups.

8. The image processing device according to claim 7, wherein the synthesis part adjusts the resolutions of the image group with different resolutions which is created from the input image and then creates a synthetic image from the image group.

9. The image processing device according to claim 5, wherein the parameter group which is applied to the image processing program includes a threshold value group that is used to determine whether the search object is included in each image as the threshold value group which is applied to each image of the image group with different resolutions which is created from the input image.

10. The image processing device according to claim 9, wherein the synthesis part adjusts the resolutions of the image group with different resolutions which is created from the input image and then creates a synthetic image from the image group.

11. The image processing device according to claim 9, wherein the display part additionally displays an evaluated value for each of the one or more parameter groups.

12. The image processing device according to claim 11, wherein the synthesis part adjusts the resolutions of the image group with different resolutions which is created from the input image and then creates a synthetic image from the image group.

13. The image processing device according to claim 12, wherein the image processing program binarizes the image group with different resolutions which is created from the input image into pixels indicating an edge and pixels not indicating an edge, and
    wherein the synthesis part aligns the resolutions of the binarized image group, performs an AND operation on pixel values at the same coordinates in the image group, and outputs the synthesis image as a result of the AND operation.

14. The image processing device according to claim 13, wherein the parameter group which is applied to the image processing program includes a threshold value group that is used to determine whether each pixel in each image is pixel indicating an edge as a threshold value group which is applied to each image of the image group with different resolutions which is created from the input image.

15. The image processing device according to claim 12, wherein the image processing program binarizes the image group with different resolutions which is created from the input image into pixels indicating an edge and pixels not indicating an edge, and wherein the synthesis part aligns the resolutions of the binarized image group, performs an OR operation on pixel values at the same coordinates in the image group, and outputs the synthesis image as a result of the OR operation.

16. The image processing device according to claim 15, wherein the parameter group which is applied to the image processing program includes a threshold value group that is used to determine whether each pixel in each image is pixel indicating an edge as a threshold value group which is applied to each image of the image group with different resolutions which is created from the input image.

17. The image processing device according to claim 12, wherein the image processing program binarizes the image group with different resolutions which is created from the input image into pixels indicating an edge and pixels not indicating an edge, and
wherein the synthesis part aligns the resolutions of the binarized image group, synthesizes pixels at the same coordinates in the image group such that information of pixel values is not lost, and outputs the synthesis image as the result of the synthesis.

18. The image processing device according to claim 17, wherein the parameter group which is applied to the image processing program includes a threshold value group that is used to determine whether each pixel in each image is pixel indicating an edge as a threshold value group which is applied to each image of the image group with different resolutions which is created from the input image.

19. A setting support method of supporting setting of parameters for an image processing program, the setting support method comprising:
  a step of acquiring an input image including a search object;
  a step of applying one or more predetermined parameter groups to an image processing program which searches the search object using an image group with different resolutions which is created from the input image, acquiring a search result from the image processing program for each of the one or more parameter groups, and acquiring the image group which is acquired in the course of execution of the image processing program for each of the one or more parameter groups;
  a step of creating a synthetic image from each of the acquired one or more image groups;
  a step of displaying the created one or more synthetic images and displaying the acquired one or more search results to overlap the one or more synthetic images on a display part;
  a step of receiving an operation of selecting one of the one or more synthetic images displayed on the display part; and
  a step of setting the parameter group corresponding to the synthetic image selected by the operation in the image processing program.

20. A non-transitory computer-readable media, compressing a setting support program for supporting setting of parameters for an image processing program, the setting support program causing an image processing device to perform:
  a step of acquiring an input image including a search object;
  a step of applying one or more predetermined parameter groups to an image processing program which searches the search object using an image group with different resolutions which is created from the input image, acquiring a search result from the image processing program for each of the one or more parameter groups, and acquiring the image group which is acquired in the course of execution of the image processing program for each of the one or more parameter groups;
  a step of creating a synthetic image from each of the acquired one or more image groups;
  a step of displaying the created one or more synthetic images and displaying the acquired one or more search results to overlap the one or more synthetic images on a display part;
  a step of receiving an operation of selecting one of the one or more synthetic images displayed on the display part; and
  a step of setting the parameter group corresponding to the synthetic image selected by the operation in the image processing program.

* * * * *